(12) United States Patent
Yamada et al.

(10) Patent No.: US 8,658,243 B2
(45) Date of Patent: Feb. 25, 2014

(54) METHOD FOR FORMING OPTICAL COATING AND OPTICAL ELEMENT HAVING SUCH COATING

(75) Inventors: Kazuhiro Yamada, Saitama-ken (JP); Hiroyuki Nakayama, Tokyo (JP); Mineta Suzuki, Saitama-ken (JP); Takanobu Shiokawa, Kanagawa-ken (JP); Koji Sato, Yamanashi-ken (JP)

(73) Assignee: Ricoh Imaging Company, Ltd., Tokyo (JP)

( * ) Notice: Subject to any disclaimer, the term of this patent is extended or adjusted under 35 U.S.C. 154(b) by 925 days.

(21) Appl. No.: 12/250,666

(22) Filed: Oct. 14, 2008

(65) Prior Publication Data

US 2009/0098409 A1    Apr. 16, 2009

(30) Foreign Application Priority Data

Oct. 15, 2007 (JP) ................ 2007-268291

(51) Int. Cl.
*B29D 11/00* (2006.01)

(52) U.S. Cl.
USPC ............. 427/164; 427/167; 427/169

(58) Field of Classification Search
USPC .................. 427/162, 164
See application file for complete search history.

(56) References Cited

U.S. PATENT DOCUMENTS

2006/0013986 A1 * 1/2006 Dolan .................. 428/54
2006/0239886 A1 10/2006 Nakayama et al.

FOREIGN PATENT DOCUMENTS

| | | |
|---|---|---|
| JP | 2000-042419 | 2/2000 |
| JP | 2000-261013 | 9/2000 |
| JP | 2001-166103 | 6/2001 |
| JP | 2004-123484 | 4/2004 |
| JP | 2004-144944 | 5/2004 |
| JP | 2004-287461 | 10/2004 |
| JP | 2006-044955 | 2/2006 |
| JP | 2006-151800 | 6/2006 |
| JP | 2007-094150 | 4/2007 |
| JP | 2007-241177 | 9/2007 |
| JP | 2007-244938 | 9/2007 |

OTHER PUBLICATIONS

Examiner provided Machine Translation of Fujii (JP 2007-094150) (all paragraph numbers refer to the machine translation provided by Examiner).*
U.S. Appl. No. 12/199,097, filed Aug. 27, 2008.
English language Abstract of JP 2001-166103.
English language Abstract of JP 2004-144944.
English language Abstract of JP 2007-094150.
English language Abstract of JP 2004-123484.
English language Abstract of JP 2006-044955.
English language Abstract of JP2006-151800.

* cited by examiner

*Primary Examiner* — Yogendra Gupta
*Assistant Examiner* — Robert J Grun
(74) *Attorney, Agent, or Firm* — Greenblum & Bernstein, P.L.C.

(57) ABSTRACT

A method for forming an optical coating comprising the steps of forming a fine-structure layer mainly composed of an inorganic metal oxide on the surface of an optical member, and then forming an inorganic, hard layer by a liquid-phase deposition method.

12 Claims, 1 Drawing Sheet

METHOD FOR FORMING OPTICAL COATING AND OPTICAL ELEMENT HAVING SUCH COATING

FIELD OF THE INVENTION

The present invention relates to a method for forming an optical coating comprising a fine-structure metal oxide layer and an inorganic, hard layer, and an optical element having such an optical coating.

BACKGROUND OF THE INVENTION

Optical elements such as objective lenses for light pickup devices, spectacle lenses, optical lenses for endoscopes, optical lenses for imaging devices, etc. are provided with optical coatings such as anti-reflection coatings, infrared-absorbing layers, etc. There are, for instance, an anti-reflection coating comprising at least one dielectric layer having a different refractive index from that of a lens for utilizing an interference effect of light (JP 2007-94150 A), and an anti-reflection coating having a rough zinc oxide layer, etc. on the surface (JP 2001-166103 A).

Although an optical element having such optical coating is required to have high scratch resistance, a low-refractive-index, porous layer constituting an outermost layer of the anti-reflection coating and an anti-reflection coating having surface roughness, for instance, have insufficient scratch resistance. When a protective layer is formed to improve the scratch resistance of such anti-reflection coating, the refractive index of the porous layer changes, and the anti-reflecting effect of the roughness decreases, resulting in optical elements with deteriorated performance.

JP 2004-144944 A discloses a spectacle lens provided with an inorganic, hydrophilic, hard layer formed by a metal oxide deposited on a lens substrate from an aqueous solution containing a metal fluoride. It is described that this inorganic, hydrophilic, hard layer comprises silicon oxide, zirconium oxide and titanium oxide, and contains a surfactant in fine recesses on the surface, thereby exhibiting antifogging property and water washability. It is further described that the inorganic, hydrophilic, hard layer has improved scratch resistance. However, the inorganic, hydrophilic, hard layer described in JP 2004-144944 A is formed on a lens substrate surface without an optical coating such as an anti-reflection coating.

OBJECT OF THE INVENTION

Accordingly, an object of the present invention is to provide an optical element having an optical coating having excellent scratch resistance, such as an anti-reflection coating, etc., and its production method.

DISCLOSURE OF THE INVENTION

As a result of intense research in view of the above object, it has been found that the formation of an inorganic, hard layer on an optical member having a fine-structure layer on the surface by a liquid-phase deposition method improves the scratch resistance of the optical member without substantially changing optical properties due to the fine-structure layer. The present invention has been completed based on this finding.

Thus, the method of the present invention for forming an optical coating comprises forming a fine-structure layer mainly composed of an inorganic metal oxide on an optical member, and then forming an inorganic, hard layer thereon by a liquid-phase deposition method.

The fine-structure layer is preferably formed by a sol-gel method. The fine-structure layer is preferably a porous layer or a fine-roughness layer. The main component of the fine-structure layer is preferably silicon oxide or aluminum oxide, more preferably silicon oxide. The fine-structure layer formed is preferably fired at 150° C. or lower. The fine-structure layer preferably has a physical thickness of 15-500 nm.

A deposition reaction material used in the liquid-phase deposition method is preferably a metal fluoride complex. The metal fluoride complex preferably comprises ammonium silicon fluoride and/or ammonium zirconium fluoride.

A basic catalyst is preferably used in the liquid-phase deposition method. The basic catalyst is preferably ammonia water.

The optical coating is preferably an anti-reflection coating.

The optical coating is preferably formed on an objective lens in a light pickup device, a spectacle lens, an optical lens for an endoscope, or an optical lens for an imaging device. The optical member is preferably made of a resin.

The optical element of the present invention comprises an optical coating formed by the above method.

DESCRIPTION OF THE PREFERRED EMBODIMENTS

Figure 1:
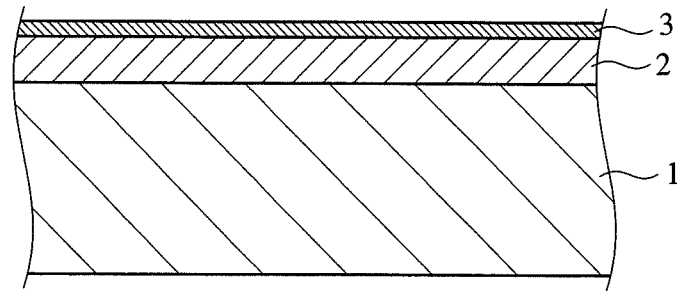
FIG. 1 is a cross-sectional view showing one example of the optical elements of the present invention.

As shown in FIG. 1, the optical element of the present invention comprises an optical member 1, a fine-structure layer 2 formed on the optical member 1, and an inorganic, hard layer 3 formed on the fine-structure layer 2 by a liquid-phase deposition method. Materials for the optical member 1 may be any one of glass, crystalline materials and plastics. Specific examples of the optical member materials include optical glass such as BK7, LASF016, LaFK55 and SF5, Pyrex (registered trademark) glass, quartz, soda-lime glass, white-crown glass, PMMA resins, PC resins, polyolefin resins, cycloolefin polymers, etc. These materials have refractive indices in a range of 1.45-1.85. The optical member may be in a shape of a flat plate, a lens, a prism, a light guide, a film, a diffraction element, etc.

(1) Fine-Structure Layer

The fine-structure layer 2 is preferably an anti-reflection coating comprising a porous layer, a fine-roughness layer, etc.

(i) Anti-Reflection Coating Comprising Porous Layer

Figure 2:
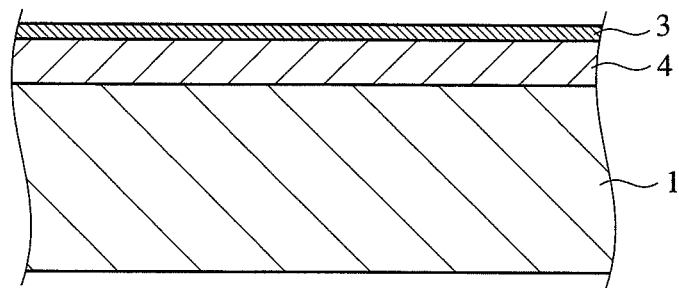
FIG. 2 is a cross-sectional view showing another example of the optical elements of the present invention.
Figure 3:
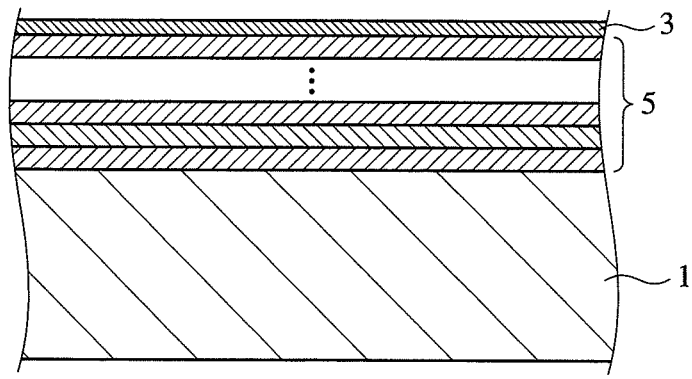
FIG. 3 is a cross-sectional view showing a further example of the optical elements of the present invention.

When the anti-reflection coating comprises a porous layer, the porous layer is preferably at least one nanoporous silica layer composed of organic-modified silica. As shown in FIG. 2, when the anti-reflection coating 4 is a single layer, it is preferably composed only of a nanoporous silica layer. However, the present invention is not restricted thereto, but may have pluralities of nanoporous silica layers, or different layers from the nanoporous silica layer. Though not particularly restricted, materials for the multilayer anti-reflection coating may be $SiO_2$, $TiO_2$, $MgF_2$, $SiN$, $CeO_2$, $ZrO_2$, etc. As shown in FIG. 3, the anti-reflection coating 5 is preferably multilayer. A multilayer, anti-reflection coating 5 may be formed, for instance, by properly combining pluralities of layers having different refractive indices to have a high anti-reflecting effect. When the anti-reflection coating is a multilayer, its surface layer is preferably a nanoporous silica layer. With the nanoporous silica layer formed on the surface, there is small difference in a refractive index between an incident medium and the anti-reflection coating, resulting in an excellent anti-reflecting effect and an efficient antifogging effect.

Though not particularly restricted, the anti-reflection coating can be formed, for instance, by a vacuum vapor deposition method, a sputtering method, a chemical vapor deposition (CVD) method, a sol-gel method, etc. When the anti-reflection coating is multilayer, the nanoporous silica layer on the surface is preferably formed by a wet-film-forming method such as a sol-gel method, etc., and the other layers are preferably formed by a vacuum vapor deposition method. The sol-gel method is effective to form a porous layer having a low refractive index, while the vacuum vapor deposition method can relatively easily control film-forming conditions, thereby being excellent in reproducibility in thickness and refractive index. The nanoporous silica layer formed by the sol-gel method can be hardened by a known method such as firing, ultraviolet curing, infrared curing, electron beam curing, etc. Particularly preferable is firing the formed layer at 150° C. or lower.

(ii) Anti-Reflection Coating Having Fine Roughness

When the anti-reflection coating has fine roughness, the fine-roughness layer can be produced by forming a metal oxide layer and then treating it with acid, etc. Alternatively, it may be a layer comprising fine inorganic particles of $SiO_2$, $Sb_2O_5$, $GeO_2$, $SnO_2$, $Al_2O_3$, $Tl_2O_3$, $In_2O_3$, $TiO_2$, $ZrO_2$, $WO_3$, etc., and a binder. The fine, inorganic particles are preferably colloidal particles of silicon compounds such as $SiO_2$ (silica), etc.

The fine-roughness layer may be, for instance, a layer obtained by treating an alumina-containing gel layer or a vapor-deposited layer of aluminum, alumina or a mixture thereof with hot water, or a layer obtained by treating a zinc compound-containing gel layer with water at 20° C. or higher. The former has surface roughness irregularly comprising a lot of fine, irregular-shaped projections generated by hot water acted on the above gel layer or vapor-deposited layer, and groove-like recesses therebetween. This layer may be called "fine-roughness alumina layer," unless otherwise mentioned. The latter has surface roughness irregularly comprising deposit projections generated by water at 20° C. or higher acted on the zinc compound-containing gel layer, and recesses therebetween. Such projections are extremely fine, having different shapes depending on the type of the zinc compound. This layer may be called "fine-roughness zinc compound layer," unless otherwise mentioned.

The fine-roughness alumina layer is preferably composed mainly of alumina, aluminum hydroxide or a mixture thereof, more preferably composed of alumina only. It may contain at least one optional component selected from the group consisting of zirconia, silica, titania, zinc oxide and zinc hydroxide, if necessary. Although the optional component content is not particularly restricted as long as fine roughness is formed by the treatment of the above gel layer or vapor-deposited layer with hot water, and as long as it is within a range not deteriorating the transparency of the optical element, it is preferably 0.01-50% by mass, more preferably 0.05-30% by mass, based on 100% by mass of the entire dust-repellent layer.

The fine-roughness zinc compound layer is preferably composed mainly of zinc oxide and/or zinc hydroxide, more preferably either one of them, though it may contain at least one optional component selected from the group consisting of alumina, zirconia, silica and titania, if necessary. Although the optional component content is not particularly restricted as long as fine roughness is formed by the treatment of the zinc compound-containing gel layer with water at 20° C. or higher, and as long as it is within a range not deteriorating the transparency of the optical element, it is preferably 0.01-50% by mass, more preferably 0.05-30% by mass, based on 100% by mass of the entire dust-repellent layer.

The fine-roughness layer may be a layer of a transparent metal oxide such as alumina, zinc oxide, zirconia, silica, titania, etc., which is patterned by photolithography.

(2) Inorganic, Hard Layer

The inorganic, hard layer 3 is formed by a liquid-phase deposition (LPD) method. In the liquid-phase deposition method for forming a thin metal oxide film from an aqueous solution, the following chemical reaction proceeds when a boron compound is added to an aqueous solution of a metal fluoride complex.

$$MeF_6^{2-} + 2H_2O \leftrightarrows MeO_2 + 6F^- + 4H^+ \quad (1)$$

$$B_2O_3 + 8F^- + 6H^+ \to 2BF_4^- + 3H_2O \quad (2)$$

wherein Me represents a metal element.

As shown in the formula (1), $MeF_6^{2-}$ complex ion is in a chemical equilibrium relation with $MeO_2$ and $F^-$ ion. When a boron compound forming a stable compound with $F^-$ ion is added, the $F^-$ ion is consumed as shown in the formula (2), so that the equilibrium of the formula (1) shifts rightward to deposit $MeO_2$. It is expected that this deposition covers defects such as cracks in the fine-structure layer formed on the optical member 1. It is also considered that the interaction of the inorganic, hard layer formed and the fine-structure layer strengthens their adhesion, and increases the strength of the fine-structure layer.

The metal fluoride complexes may be alkali metal salts, alkaline earth metal salts, ammonium salts, etc. of metal fluorides, preferably ammonium salts of metal fluorides. Specifically, it is preferable to use a deposition reaction material containing ammonium silicon fluoride $[(NH_4)_2SiF_6]$ and/or ammonium zirconium fluoride $[(NH_4)_2ZrF_6]$. A substrate having an optical coating such as a multilayer, anti-reflection coating is immersed in an aqueous medium of such metal fluoride, so that the dissolved fluorine atoms are captured by boric acid, etc. to precipitate a metal oxide from the aqueous medium and deposit it as an inorganic, hard layer on the optical coating.

Both ammonium silicon fluoride and ammonium zirconium fluoride may be used at any ratios, but the amount of the ammonium silicon fluoride is usually 0.1-99.8% by mol, preferably 5-95% by mol, based on 100% by mol of the total ammonium metal fluorides.

In addition to the ammonium silicon fluoride and the ammonium zirconium fluoride, other metal fluorides may be contained. Examples of the other metal fluorides include ammonium tin fluoride $[(NH_4)_2SnF_6]$, ammonium tantalum fluoride $[(NH_4)_2TaF_7]$, ammonium niobium fluoride $[(NH_4)_2NbF_7]$, ammonium indium fluoride $[(NH_4)_2InF_6]$, ammonium gallium fluoride $[(NH_4)_2GaF_6]$, ammonium aluminum fluoride $[(NH_4)_3AlF_6]$, etc. Such other metal fluoride may be used in an amount of 0.1-40% by mol, preferably 1-20% by mol, based on 100% by mol of the total metal fluorides.

To deposit the metal oxide, the metal fluoride is dissolved in an aqueous medium such as water or a mixed water/alcohol solvent, and a fluorine-capturing agent is added. The concentration of the metal fluoride in an aqueous medium is preferably 0.0001-1 mol/L, more preferably 0.001-0.5 mol/L. The fluorine-capturing agent may be a boron compound such as boron oxide, boric acid, sodium tetraboride, etc. The boron oxide is particularly preferable. The boron oxide is added, such that boron atoms are 1-50 mol, preferably 1-25 mol, per 1 mol of fluorine atoms contained in the aqueous metal fluoride solution. The boron oxide is added in the form of an aqueous solution to the aqueous metal fluoride solution.

The deposition reaction of the metal oxide from the aqueous metal fluoride solution is conducted at a temperature of preferably 20-60° C., more preferably 25-55° C., preferably for several hours to 24 hours.

In the liquid-phase deposition method, a basic catalyst is preferably added to suppress the concentration of boric acid from increasing in the solution in which the metal oxide is deposited, and to keep the solution at proper pH. The amount of the basic catalyst added may be arbitrarily determined depending on the optical member and the fine-structure layer subjected to a deposition treatment, but it is preferably 0.001-0.05 mol/L based on the total amount of the aqueous medium. The basic catalyst may be a weak base such as ammonia, magnesium hydroxide, aluminum hydroxide, iron hydroxide, etc.; or a strong base such as sodium hydroxide, potassium hydroxide, calcium hydroxide, barium hydroxide, etc., and it is preferably a weak base, more preferably ammonia. Ammonia is preferably used in the form of an aqueous solution (ammonia water).

After a substrate having an optical coating is immersed in an aqueous medium as described above to deposit an metal oxide on the optical coating, the substrate is taken out of the aqueous medium and dried, thereby forming an inorganic, hydrophilic, hard layer on a lens substrate. The average thickness of the inorganic, hard layer thus formed is preferably 1 nm to 0.5 μm, more preferably 50 nm to 0.3 μm.

The present invention will be explained in more detail referring to Examples below without intention of restricting the present invention thereto.

EXAMPLE 1

(1) Preparation of Sol Containing Organic-Modified Silica

After 5.21 g of tetraethoxysilane and 4.38 g of ethanol were mixed, 0.4 g of hydrochloric acid (0.01 N) was added, and stirring was conducted for 90 minutes. With 44.3 g of ethanol and 0.5 g of ammonia water (0.02 N) added, stirring was conducted for 46 hours, and then this mixed solution was aged at 60° C. for 46 hours to obtain a wet gel. This wet gel was washed with ethanol by decantation, and decantation was repeated to replace the dispersing medium of the wet gel with methyl isobutyl ketone (MIBK). With a solution of 5% by volume of trimethylchlorosilane in MIBK added to this wet gel, stirring was conducted for 20 hours to organically modify silicon oxide ends. The resultant organic-modified silica gel was mixed with isopropyl alcohol (IPA) to a concentration of 10% by mass, and turned to a sol by ultrasonic irradiation (20 kHz, 500 W, 40 minutes).

(2) Formation of Fine-Structure Layer

A flat BK7 glass plate of 20 mm×20 mm×1 mm was dip-coated with the resultant organic-modified silica sol to a physical thickness of 141 nm, and fired at 100° C. for 3 hours.

(3) LPD Treatment 40 g of ammonium silicon fluoride and 10 g of ammonium zirconium fluoride were dissolved in 2000 mL of water, and kept at 40° C. with 20 mL of ammonia water (28%) added. 40 g of boric acid was added to this aqueous solution, stirred and dissolved. A flat BK7 glass plate provided with an anti-reflection coating formed by a silica aerogel was immersed in the solution for 10 hours. The flat glass plate taken out of the solution was washed with water for 10 minutes and then dried.

(4) Evaluation

To evaluate the adhesion of the anti-reflection coating to the flat glass plate, its surface was rubbed with steel wool (#0000), but no scratch was formed.

EXAMPLE 2

(1) Preparation of Sol Containing Organic-Modified Silica

After 6.21 g of methacryloxypropyltrimethoxysilane and 3.04 g of methanol were mixed, 0.4 g of hydrochloric acid (0.01 N) was added, and stirring was conducted at 60° C. for 3 hours. With 30.8 g of methanol and 0.5 g of ammonia water (0.02 N) added, stirring was conducted for 48 hours, and then this mixed solution was aged at 60° C. for 72 hours to obtain a wet gel. This wet gel was mixed with ethanol and shaken for 10 hours. Thereafter, unreacted products, etc. were removed by decantation, and the dispersing medium was substituted by ethanol. Decantation was repeated to substitute the dispersing medium of the wet gel with methyl isobutyl ketone (MIBK). With a solution of 5% by volume of trimethylchlorosilane in MIBK added to this wet gel, stirring was conducted for 30 hours to organically modify silicon oxide ends. The resultant organic-modified silica gel was mixed with MIBK, shaken for 24 hours, and then decanted. The organic-modified silica gel was mixed with MIBK to a concentration of 1% by mass, and turned to a sol by ultrasonic irradiation (20 kHz, 500 W, 20 minutes). 3% by mass of 2-methyl-1-[4-(methylthio)phenyl]-2-morpholinopropane-1-on was added to this sol-like dispersion on a solid silica basis to prepare a coating liquid containing organic-modified silica.

(2) Formation of Fine-Structure Layer

A flat BK7 glass plate of 20 mm×20 mm×1 mm was dip-coated with the resultant organic-modified silica sol, and the resultant coating was polymerized by ultraviolet irradiation at 1500 mJ/cm$^2$ using a UV irradiation apparatus available from Fusion Systems, and fired at 150° C. for 1 hour to form an organic-modified, silica aerogel layer.

(3) LPD Treatment

After 40 g of ammonium silicon fluoride and 10 g of ammonium zirconium fluoride were dissolved in 2000 mL of water, 20 mL of ammonia water (28%) was added, and the resultant solution was kept at 40° C. 15 g of boric acid was added to this aqueous solution, stirred and dissolved. A flat BK7 glass plate provided with an anti-reflection coating formed by a silica aerogel was immersed in the solution for 10 hours. The flat glass plate taken out of the solution was washed with water for 10 minutes and dried.

(4) Evaluation

To evaluate the adhesion of the anti-reflection coating to the flat glass plate, its surface was rubbed with steel wool (#0000), but no scratch was formed.

EXAMPLE 3

An anti-reflection coating was formed in the same manner as in Example 1, except that a pickup lens made of "ZEONEX340R" (refractive index nd: 1.509, available from Zeon Corporation) was used as an optical member, and subjected to an LPD treatment. To evaluate the adhesion of the resultant anti-reflection coating to the pickup lens, its surface was rubbed with steel wool (#0000), but no scratch was formed.

EFFECT OF THE INVENTION

Because the method of the present invention can form an optical coating at a low temperature, with improved hardness without changing the optical properties (refractive index) of an anti-reflection coating, etc. having a fine structure, an optical element having excellent optical properties and scratch resistance can be obtained, even when a substrate having relatively low hardness, such as plastics, etc. is used.

The present disclosure relates to subject matter contained in Japanese Patent Application No. 2007-268291 filed on Oct. 15, 2007, which is expressly incorporated herein by reference in its entirety.

What is claimed is:

1. A method for forming an optical coating comprising the steps of forming a fine-structure layer mainly composed of an inorganic metal oxide on the surface of an optical member, and then forming an inorganic, hard layer by a liquid-phase deposition method, wherein the liquid-phase deposition method comprises adding a boron compound to an aqueous solution of a metal fluoride complex to deposit the metal oxide, and wherein said liquid-phase deposition method uses a basic catalyst.

2. The method for forming an optical coating according to claim 1, wherein said fine-structure layer is formed by a sol-gel method.

3. The method for forming an optical coating according to claim 1, wherein said fine-structure layer is a porous layer or a layer having fine roughness.

4. The method for forming an optical coating according to claim 1, wherein said fine-structure layer is mainly composed of silicon oxide or aluminum oxide.

5. The method for forming an optical coating according to claim 1, wherein the formed fine-structure layer is fired at 150° C. or lower.

6. The method for forming an optical coating according to claim 1, wherein said fine-structure layer has a physical thickness of 15-500 nm.

7. The method for forming an optical coating according to claim 1, wherein said inorganic, hard layer is mainly composed of silicon oxide.

8. The method for forming an optical coating according to claim 1, wherein said metal fluoride complex comprises ammonium silicon fluoride and/or ammonium zirconium fluoride.

9. The method for forming an optical coating according to claim 1, wherein said basic catalyst is ammonia water.

10. The method for forming an optical coating according to claim 1, wherein said optical coating is an anti-reflection coating.

11. The method for forming an optical coating according to claim 1, wherein said optical coating is formed on an objective lens in a light pickup device, a spectacle lens, an optical lens for an endoscope, or an optical lens for a imaging device.

12. The method for forming an optical coating according to claim 1, wherein said optical member is made of a resin.

* * * * *